United States Patent [19]
De Smet

[11] 3,878,106
[45] Apr. 15, 1975

[54] APPARATUS FOR SEPARATING A MASS BY FILTERING INTO A SOLID PORTION AND A LIQUID PORTION

[75] Inventor: Jean Albert De Smet, Wilrijk, Belgium

[73] Assignee: Extraction De Smet, Edegem, Belgium

[22] Filed: June 4, 1973

[21] Appl. No.: 366,359

[30] Foreign Application Priority Data
June 8, 1972 Luxembourg............................ 65488

[52] U.S. Cl................................. 210/351; 210/489
[51] Int. Cl............................................ B01d 29/10
[58] Field of Search ........... 210/351, 350, 489, 499; 209/273

[56] References Cited
UNITED STATES PATENTS
3,017,996  1/1962  Riley.................................. 210/351
FOREIGN PATENTS OR APPLICATIONS
907,485  10/1962  United Kingdom................. 210/351
244,142  12/1962  United Kingdom................. 210/351
2,106,538  8/1971  Germany............................ 210/351
2,106,315  8/1971  Germany............................ 210/351

*Primary Examiner*—John Adee
*Assistant Examiner*—F. F. Calvetti
*Attorney, Agent, or Firm*—Wenderoth, Lind & Ponack

[57] ABSTRACT

An apparatus for separating a liquid-solid or a wet mass by filtering into a solid portion and a liquid portion, comprises a disc-shaped chamber bound on one side thereof by a disc-shaped fixed solid wall and on the other side thereof by a disc-shaped fixed filtering wall opening into a discharge enclosure for the liquid portion. The solid wall has an annular outer rim and an inner hub through which extends a supply duct for the material to be filtered opening in the chamber. An impervious resilient element is mounted inside the chamber against at least one solid wall thereof. Means is provided to displace the resilient element towards the filtering wall.

3 Claims, 1 Drawing Figure

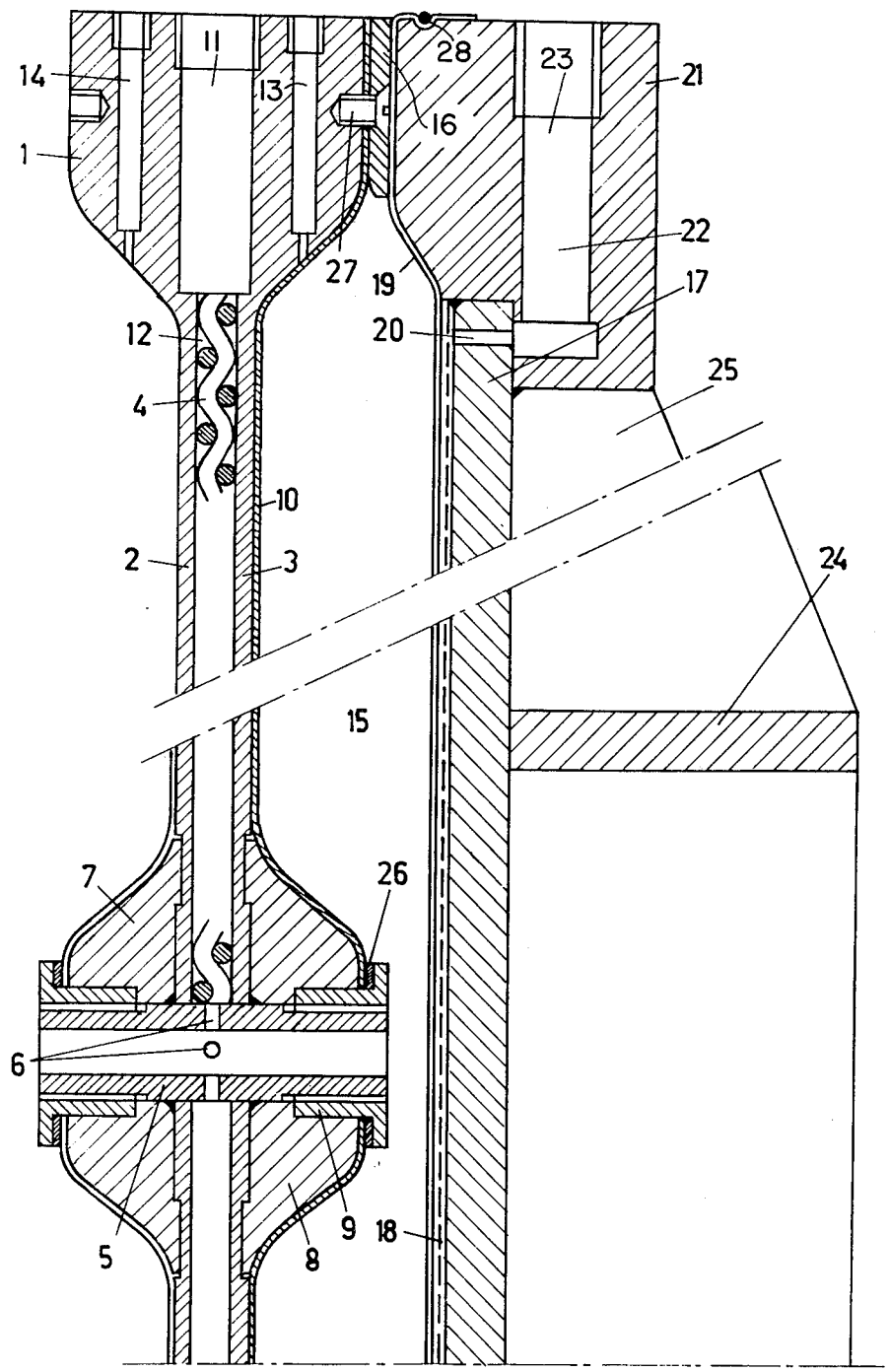

3,878,106

APPARATUS FOR SEPARATING A MASS BY FILTERING INTO A SOLID PORTION AND A LIQUID PORTION

BACKGROUND OF THE INVENTION

The invention pertains to an apparatus for separating a wet mass by filtering the mass into a solid portion and a liquid portion. The apparatus includes a chamber bounded on one side by a fixed solid wall and on the other side by a fixed filtering wall opening in a discharge enclosure for the liquid portion, a supply duct for the material to be filtered opening in the chamber.

Apparatus of this kind are used for winterizing oils. The cooled oils are fed to the chamber through the supply duct. The liquid portion which no longer turns cloudy thereafter by the treatment temperature or higher temperatures, passes through the filtering wall and is discharged through the discharge enclosure. The solid portion comprised notably of solid lycerides, is retained inside the chamber as an oil cake.

Such oil cake retains however a substantial amount of oil which is liquid at the treatment temperature and which, with the present condition of the art, can not be recovered without an additional operation in another apparatus.

SUMMARY OF THE INVENTION

The invention has for its object to obviate such prior art drawback, and the apparatus according to the invention makes it possible with an intermediate or final operation, to free substantially all the liquid portion from the oil cake.

For this purpose, an impervious resilient element is mounted inside the chamber against at least one solid wall thereof, means being provided to displace the resilient element towards the filtering wall.

It is to be noted that it is known to compress a mass so as to expel therefrom a liquid portion and thus to perform a separation by pressing into a solid portion and a liquid portion. It is also known to retain this mass inside a filter cloth during such pressing operation.

It is not known however to provide in one and the same apparatus a single chamber the volume of which remains constant during normal filtering, while such volume may be reduced for pressing the mass contained therein, such pressing comprising either a final operation or an intermediate operation between two normal filtering operations.

In an advantageous embodiment of the invention, a channel for feeding a pressurized fluid opens between the impervious resilient element and the wall against which such element is mounted.

In a particular embodiment, the chamber is bounded on one side thereof by a filtering wall mounted inside a frame and on the other side thereof by a solid wall with an annular rim which bears against the frame and a center hub into which opens the supply duct for the mass to be filtered, the resilient element being formed by a diaphragm which is attached at the middle part thereof relative to the hub and at the circumferential part thereof to the rim.

In a preferred embodiment of the invention, a channel for feeding a fluid is provided in the rim.

BRIEF DESCRIPTION OF THE INVENTION

Other details and features of the invention will be apparent from the description given below by way of non limitative example and with reference to the accompanying drawing, the single FIGURE of which is a section through part of an apparatus according to the invention for separating a wet mass by filtering into a solid portion and a liquid portion.

DETAILED DESCRIPTION OF THE INVENTION

The apparatus shown diagrammatically in the FIGURE comprises a series of filtering chambers 15, only one of which has been shown.

Chamber 15 is bounded on one side thereof by a fixed solid disc-shaped wall and on the other side thereof by a disc-shaped filtering wall which lets the liquid portion of the mass pass therethrough and which retains the solid portion of the mass.

The fixed solid wall is shaped as two disks 2 and 3 which are spaced apart by a wire cloth 4. The wire diameter is for instance about 3.5 mm and the linear dimension of the meshes is for instance about 20 to 30 mm.

The solid wall is thus of circular shape. Both disks 2 and 3 are mounted on a central tube 5. On either side of the disk unit 2,3 which comprises the wall are mounted those parts 7 and 8 which form a hub. Parts 7 and 8 are integral both with the respective disks 2 and 3 and with the central tube 5.

On the circumference thereof, the wall formed by the disks 2 and 3 is integral with a rim-like part 1. Inside rim 1 is provided a channel 11.

The free space 12 between disks 2 and 3 which are spaced by the cloth 4 communicates on the one hand with channel 11 and on the other hand through ports 6 provided in the tube 5, with the interior of the tube. The tube opens on both sides thereof into opposite filtering chambers 15.

The filtering wall which is also fixed, is formed of a stainless wire cloth 18 and of a synthetic thread filtering cloth 19. The stainless wire cloth 18 comprises a support for the synthetic thread cloth 19.

The stainless wire cloth 18 with a weaving of 15 meshes per inch, is attached at the edge thereof to a frame 21 which is integral with a metal plate 17. The cloth 19 bears against the cloth 18 and the frame 21 to which it is attached by a wire 28.

A ring-shaped annular channel 22 is provided in the frame 21. A series of openings 20 provided in the metal plate 17 open into channel 22. A single discharge channel 23 provides for discharge of the liquid collected in the ring channel 22.

A diaphragm 10 comprising a disc-shaped impervious resilient element takes the shape of the disk 3 completed by the hub-like part 8 and the rim 1.

The diaphragm 10 is attached at the center part thereof to the hub part 8 by means of a washer 26 and a sleeve 9 screwed onto the tube 5. On the circumference thereof, the diaphragm 10 is attached to rim 1 by a clamping ring 16 which is retained against the rim by a plurality of screws 27.

A small-diameter channel 13 provided in the rim 1 opens between the rim and the diaphragm 10. Channel 13 provides for the feed therein of a fluid such as pressurized air.

A similar channel 14 on the other side of rim 1 fulfills the same function for the adjacent filtering chamber which is shown but partly.

The plate 17 is reinforced by a tube 24 which is only partly shown.

The wet mass to be filtered is supplied to the filtering chamber through the channel 11, the guide space 12, the ports 6 and the tube 5 which comprise together a supply duct.

Inside the filtering chamber the solid portion of the supplied mass is retained as an oil cake. The liquid portion of the mass passes continuously through those elements 19 and 18 which comprise a filtering wall.

The liquid portion is discharged through the space between the stainless wire cloth 18 and the plate 17, the ports 20, the channel 22 and the discharge channel 23 which comprise together a discharge enclosure.

During the normal filtering operation, the diaphragm 10 is retained against disk 3 as part of the fixed solid wall.

When the filtering chamber 15 is filled with oil cake, the liquid portion retained therein is expelled. For this purpose the oil cake is pressed by feeding pressurized air through the channel 13 between the fixed wall and the diaphragm. The pressurized air moves the diaphragm towards the filtering wall which still retains the oil cake solid portion, but which passes the liquid portion.

After pressing the oil cake, the pressurized air can be discharged through channel 13 and the diaphragm 10 can resume the rest position thereof against the fixed wall. The normal filtering operation can then be carried on until a new oil cake pressing operation is required. When it is no longer possible to expel oil from the oil cake through a new pressing operation, the oil cake should be discharged in the usual way, that is by dismantling the apparatus.

Even if a single filtering chamber has been described, it is clear that the apparatus will actually comprise a series of chambers next to one another, the components thereof being retained together by the usual components.

In the simplest case with two filtering chambers, the second chamber 15 which is partly shown on the left-hand side of the FIGURE, is completed in the same way as the one which is shown more fully to the right of the FIGURE.

It must be understood that the invention is in no way limited to the above embodiments and that many changes may be made therein without departing from the scope of the invention.

I claim:

1. An apparatus for separating by filtering a wet mass into a solid portion and a liquid portion, said apparatus comprising:

a solid disc-shaped fixed wall having a central hub, an outer annular rim and a continuous central portion joining said hub and said rim;

a disc-shaped resilient liquid-impervious diaphragm attached at the center thereof to said hub and attached at the periphery thereof to said rim;

a disc-shaped fixed filtering wall fixed to said rim;

said filtering wall and said diphragm forming therebetween a disc-shaped chamber;

supply duct means for supplying said wet mass through said rim, said continuous central portion and said hub into said chamber, and for continuously passing a liquid portion of said mass from said chamber through said filtering wall during a normal operation when said diaphragm is retained against said solid wall; and channel means extending through said rim into a space between said solid wall and said diaphragm for feeding a fluid into said space for selectively displacing said diaphragm toward said filtering wall at spaced intervals between normal operation.

2. An apparatus as claimed in claim 1, further comprising a frame attached to said rim, a plate integral with said frame, said filtering wall being fixed at the periphery thereof to said frame and bearing against said plate, said plate and frame having therein channel means for discharge of said liquid portion passed through said filtering wall.

3. An apparatus as claimed in claim 2, wherein said filtering wall comprises a stainless steel wire cloth bearing against said plate, and a synthetic thread cloth bearing against said stainless steel wire cloth.

* * * * *